United States Patent [19]
Aisa et al.

[11] Patent Number: 4,810,148
[45] Date of Patent: Mar. 7, 1989

[54] DRAIN BOLT

[75] Inventors: Junzo Aisa; Eizi Kosugi, both of Shizuoka, Japan

[73] Assignee: Ishikawa Tekko Kabushiki Kaisha, Tokyo, Japan

[21] Appl. No.: 152,990

[22] Filed: Feb. 8, 1988

[30] Foreign Application Priority Data

Apr. 9, 1987 [JP] Japan .................. 62-54024[U]
Sep. 30, 1987 [JP] Japan .................. 62-150275[U]

[51] Int. Cl.⁴ .................... F16B 35/02; H01F 7/02
[52] U.S. Cl. ........................... 411/383; 335/305; 252/62.54; 411/908
[58] Field of Search .......... 411/383, 395, 396, 908, 411/304; 335/305; 252/62.54

[56] References Cited

U.S. PATENT DOCUMENTS

| 1,281,842 | 10/1918 | Rosnick et al. | 335/305 |
| 2,242,830 | 5/1941 | Lisle | 335/305 |
| 2,755,932 | 7/1956 | Cohn | 335/305 |
| 2,870,384 | 1/1959 | Brooks | 335/305 |
| 3,126,617 | 3/1964 | Blume | 252/62.54 |
| 3,867,299 | 2/1975 | Rohatgi | 252/62.54 |
| 4,549,157 | 10/1985 | Loubier | 252/62.54 |

FOREIGN PATENT DOCUMENTS 930718 7/1963 United Kingdom ............... 411/304

Primary Examiner—Neill R. Wilson
Attorney, Agent, or Firm—James E. Nilles; Thomas F. Kirby

[57] ABSTRACT

A drain bolt wherein a recess is formed at the end of a male-threaded portion of a bolt body, and a sinker portion of a synthetic resin magnet is embedded in the recess of the bolt body so that a projecting portion of the magnet is projected from the end of the male-threaded portion of the bolt body. The projecting portion of the synthetic resin magnet is larger in diameter than the sinker portion. A plurality of grooves are formed on the side of the projecting portion of the synthetic resin magnet along its length.

6 Claims, 2 Drawing Sheets

DRAIN BOLT

BACKGROUND OF THE INVENTION

1. Field of the Invention

The present invention relates to a drain bolt and more particularly to a drain bolt with a magnet.

2. Description of the Prior Art

Gear boxes such as automotive transmission gear and differential gear have a tapped hole at the bottom to drain oil in the gear box. Normally the tapped hole is closed by a drain bolt screwed therein. In removing the oil in the gear box, the drain bolt is removed to allow the oil to drain through the tapped hole.

Some drain bolts have a magnet projecting into the gear box to attract iron particles produced as a result of wearing of gear. The drain bolt with a magnet can remove by attraction iron particles settled at the bottom of the gear box or contained in the oil.

Conventional drain bolts with a magnet are described as follows. In each of the drain bolts shown in FIGS. 10 through 12, a bolt body 1 has a circular recess 3 formed at the end of a male-threaded part 2 with a magnet 4 made of sintered ferrite embedded in the recess 3. In the case of FIG. 10, the magnet 4 is bonded to the bottom of the recess 3 with a bonding agent 5 which has good heat resistance and oil resistance. An annular caulking member 6 made of nonmagnetic material mounted on the inner circumference of the recess 3 has its end caulked against an end of the magnet 4. In the case of FIG. 11, the magnet 4 is bonded to the bottom of the recess 3 with the bonding agent 5. The end of the male-threaded part 2 is caulked at several locations against the end of tee magnet 4. In the case of FIG. 12, the magnet 4 is bonded to the bottom and the inner periphery of the recess 3 with the bonding agent 5. The drain bolt shown in FIG. 13 has the magnet 4 bonded to the end of the male-threaded part 2 with the bonding agent 5 and also reinforced by a set screw 7 which rigidly secures the magnet 4 to the end of the male-threaded part 2.

In these examples, the magnet 4 of sintered ferrite has low molding accuracy in terms of dimension and shape and this makes it difficult to obtain the desired shape and dimension that are optimum for assembly into the bolt body 1. The magnet 4 is also very fragile and easily broken by a strong external force. It is thus required that the magnet be fixed without exerting pressure on it as practically as possible. The common practice therefore is to interpose a jointing member such as the bonding agent 5, caulking member 6 and set screw 7 between the bolt body 1 and the magnet 4. The use of these jointing members results in an increase in the number of assembling processes.

Moreover, the magnet 4 of sintered ferrite is difficult to form into complicated shapes. For example, it cannot easily be formed into shapes in which the magnet 4 projects into the gear box to increase the iron particle attracting capability, in which the flux of the magnet 4 can effectively be utilized, or in which the surface area of the magnet 4 increases.

SUMMARY OF THE INVENTION

This invention has been accomplished in the light of these problems and is intended to secure the magnet to the bolt body without using the jointing member and at the same time increase the iron particle attracting capability of the magnet.

An object of the invention is to provide a drain bolt in which a bolt body 11 consisting of a male-threaded portion 14 and a head portion 13 has a recess 15 formed at the end of the male-threaded portion 14 and in which a magnet formed of synthetic resin 12, 12a consisting of a sinker portion 16 and a projecting portion 17 is inserted into the recess 15 so that the sinker portion 16 is embedded in the recess and that the projecting portion 17 projects from the end of the male-threaded portion 14 of the bolt body 11.

The drain bolt of this invention is characterized by the use of the synthetic resin magnet 12, 12a which has high impact resistance and can easily be formed into complex shapes with high dimensional accuracy. It is also characterized by the structure in which the synthetic resin magnet has its sinker portion 16 securely embedded in the recess 15 of the male-threaded portion 14 of the bolt body 11 by caulking, screwing, press-fit, or insert molding which forms the sinker portion and the bolt body as one integral member; and in which the projecting portion 17 of the synthetic resin magnet 12, 12a is projected from the end of the male-threaded portion 14 to effectively attract iron particles.

These and other objects and features of this invention will be described by referring to the attached drawings.

DESCRIPTION OF THE PREFERRED EMBODIMENTS

Figure 1:
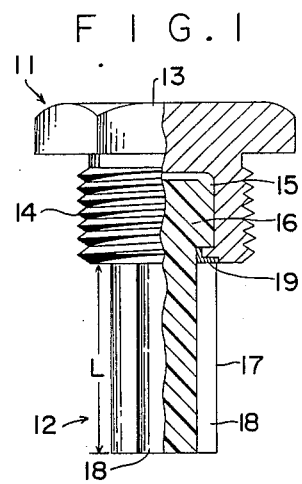
FIG. 1 is a side view, partially cut away, of a drain bolt as a first embodiment of the invention.

The embodiments of the drain bolt according to the invention are described by referring to the attached drawings.

A total of five embodiments are given and four of them are explained parallelly. In the four embodiments the description refers to common parts unless specifically stated. Parts that are specific to a particular one of the four embodiments will be so noted during the course of explanation.

Each drain bolts of first through fourth embodiments consists of a bolt body 11 and a synthetic resin magnet 12 assembled into the bolt body 11, as shown in FIGS. 1 through 5.

The bolt body 11 comprises a hexagonal head portion 13 and a male-threaded portion 14. The head portion 13 is turned by a wrench fitted over it and the male-threaded portion 14 is screwed into a tapped hole in a gear box such as transmission for which the drain bolt is used. The male-threaded portion 14 has at the center a circular recess 15 that opens at the end of the male-threaded portion 14.

The magnet 12 is formed of a synthetic resin containing ferrite magnetic material and consists of a sinker portion 16 to be inserted into the circular recess 15 of the bolt body 11 and a projecting portion 17. The projecting portion 17 is larger in diameter than the sinker portion 16 and has a plurality of four grooves 18 for example, formed on its side along the length of the projecting portion 17.

The synthetic resin magnet 12, because of the characteristics of synthetic resin, is sturdy and not easily broken when subjected to impact or to tensile or bending force, and can also be formed into complicated shapes with high accuracy and with ease. Furthermore, the synthetic resin magnet 12 will not undergo any change in shape and magnetic flux at the normal drain bolt service temperatures of 80° C. to 130° C., (e.g. transmission).

Figure 2:
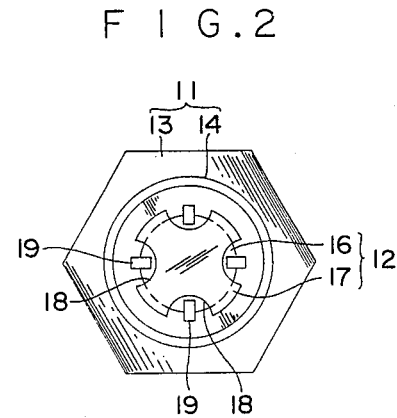
FIG. 2 is a bottom view of FIG. 1.

In the first embodiment shown in FIGS. 1 and 2, the synthetic resin magnet 12 is assembled into the bolt body in the following manner. That is, the sinker portion 16 of the synthetic resin magnet 12 is inserted into the recess 15 in the male-threaded portion 14 of the bolt body 11. With the projecting portion 17—which is continuous to and larger in diameter than the sinker portion 16—placed in contact with the end of the male-threaded portion 14, the end of the male-threaded portion 14 is caulked against the end of the sinker portion 16 where it is exposed through the four grooves 18 on the projecting portion 17. The synthetic resin magnet 12 is thus held in the bolt body 11 by caulking portion 19.

Figure 3:
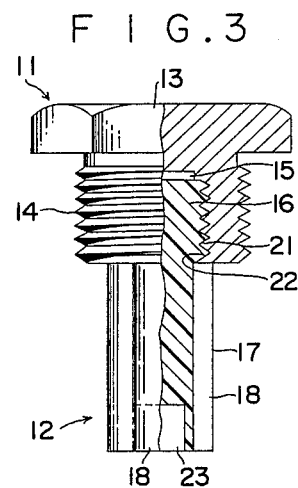
FIG. 3 is a side view, partially cut away, of a second embodiment of the invention.

In the second embodiment shown in FIG. 3, the drain bolt is assembled as follows. A female-threaded portion 21 is formed on the inner circumference of the recess 15 of the male-threaded portion 14 of the bolt body 11. The sinker portion 16 of the synthetic resin magnet 12 is formed on the outer periphery thereof with a male-threaded portion 22. The synthetic resin magnet 12 is turned by a hexagon wrench which is engaged in a hexagonal hole 23 formed at the end of the projecting portion 17, to screw the male-threaded portion 22 into the female-threaded portion 21 of the bolt body 11 so that the synthetic resin magnet 12 is securely held in the bolt body 11.

Figure 4:
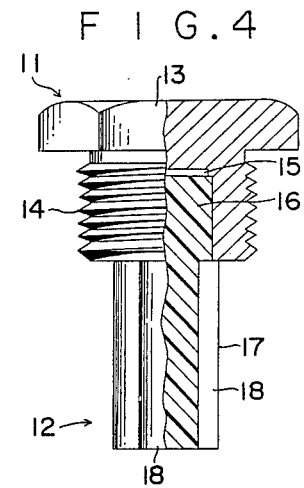
FIG. 4 is a side view, partially cut away, of a third embodiment of the invention.

In the third embodiment shown in FIG. 4, the drain bolt is assembled by press-fitting the sinker portion 16 of the synthetic resin magnet 12 into the recess 15 of the male-threaded portion of the bolt body 11. In this way the synthetic resin magnet 12 is securely held in the bolt body 11 by press-fit.

Figure 5:
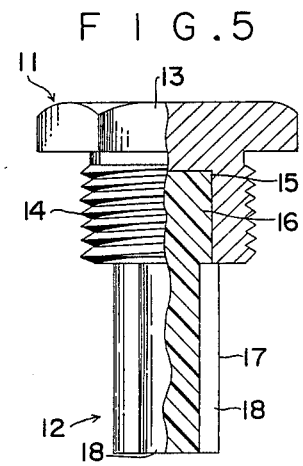
FIG. 5 is a side view, partially cut away, of a fourth embodiment of the invention.

Further, in the fourth embodiment of FIG. 5, the drain bolt is assembled as follows. The recess 15 of the male-threaded portion 14 of the bolt body 11 is used as a part of a cavity in which the synthetic resin magnet 12 is formed. With the bolt body 11 inserted into a mold for the synthetic resin magnet 12, the synthetic resin magnet 12 is molded integral with the bolt body 11. In this way the synthetic resin magnet 12 is securely held in the bolt body by the insert molding.

Figure 6:
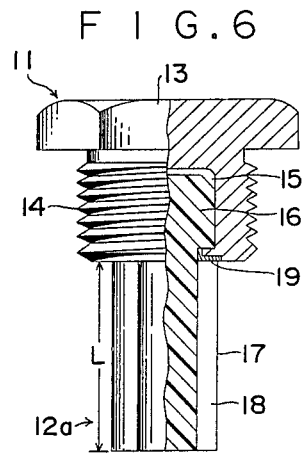
FIG. 6 is a side view, partially cut away, of a fifth embodiment of the invention.
Figure 7:
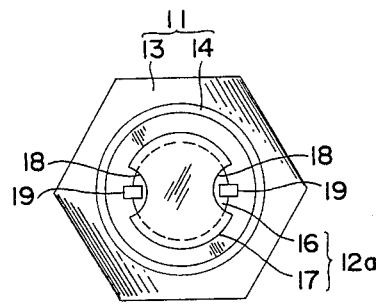
FIG. 7 is a bottom view of FIG. 6.

Lastly, the drain bolt of the fifth embodiment, as shown in FIGS. 6 and 7, is similar to the previous embodiments except that the synthetic resin magnet 12a is slightly different from the synthetic resin magnet 12 of the first through fourth embodiments shown in FIGS. 1 through 5.

Figure 8:
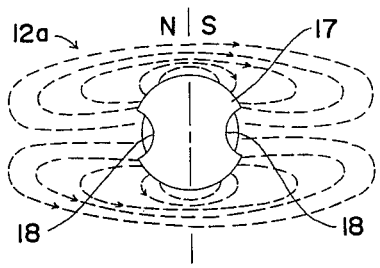
FIG. 8 is a diagram showing the magnetic field of a synthetic resin magnet.

That is, in the fifth embodiment, the number of grooves 18 formed on the side of the projecting portion 17 of the synthetic resin magnet 12a is set to two. This pair of grooves 18 is arranged symmetrical with respect to the center of the projecting portion 17 and, as shown in FIG. 8, the synthetic resin magnet 12a is magnetized so that the two grooves 18 have opposite polarities N and S.

The synthetic resin magnet 12a can be secured to the bolt body 11 in many ways. For example, as in the first embodiment of FIGS. 1 and 2, the synthetic resin magnet 12a may be secured to the bolt body 11 by the caulking portion 19; like the second embodiment shown in FIG. 3, it may be held to the bolt body 11 by screw; as in the case of the third embodiment shown in FIG. 4, it may be press-fit into the bolt body 11; or as with the fourth embodiment shown in FIG. 5, it may also be secured to the bolt 11 by insert molding.

In each of the first through fifth embodiments, since the projecting portion 17 of the synthetic resin magnet 12, 12a is made to project from the end of the male-threaded portion 14 of the bolt body 11 and also made larger in diameter than the sinker portion 16, the exposed area of the synthetic resin magnet 12, 12a, i.e., the area for attracting the iron particles is increased. Further, since the projecting portion 17 is provided with a plurality of grooves 18 to effectively utilize the magnetic flux of the synthetic resin magnet 12, 12a, the magnet's capability to attract iron particles is significantly enhanced. Moreover, the grooves 18 thus formed contribute to the saving of material and reduction in the weight of the drain bolt.

Figure 10:
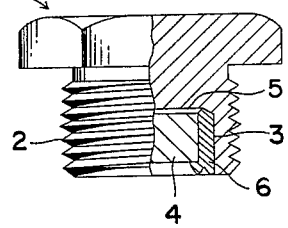
FIGS. 10 through 13 are side views, partially cut away, of conventional drain bolts.
Figure 11:
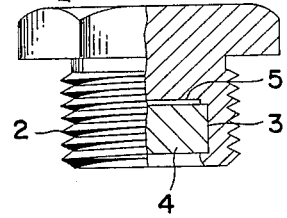
Figure 12:
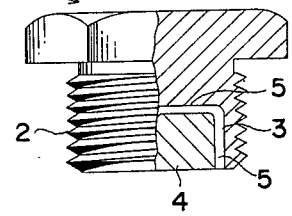
Figure 13:
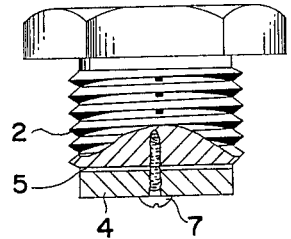

Next, we will show a table which compares the drain bolts of this invention using the synthetic resin magnet 12, 12a and the conventional drain bolts using sintered ferrite magnet 4 shown in FIGS. 10 through 12.

In the comparison, samples were picked up such that the external diameter of the projecting portion 17 of the synthetic resin magnet 12, 12a and that of the sintered magnet 4 were almost the same. The comparison was made for four cases of the length L of the projecting portion 17: 5 mm, 10 mm, 15 mm and 20 mm. See the next page for the comparison table.

Comparison Table

|  | Conventional drain bolts using sintered ferrite magnet 4 | Drain bolts of the invention using synthetic resin magnet 12 | | | | Drain bolts of the invention using synthetic resin magnet 12a | | | |
| --- | --- | --- | --- | --- | --- | --- | --- | --- | --- |
| Magnet shape | Freedom: small Dimensional accuracy: low | Freedom: large Dimensional accuracy: high | | | | Freedom: large Dimensional accuracy: high | | | |
| Surface flux density | 735 gausses | 860 gausses on average (+17%) | | | | 1150 gausses on average (+56%) | | | |
| Weight of drain bolt | 37.6 g | L = 5 33.5 g (−11%) | L = 10 35 g (−7%) | L = 15 36.5 g (−3%) | L = 20 38 g (+1%) | L = 5 34.7 g (−8%) | L = 10 36.2 g (−4%) | L = 15 37.8 g (+1%) | L = 20 39.6 g (+5%) |

Comparison Table-continued

|  | Conventional drain bolts using sintered ferrite magnet 4 | Drain bolts of the invention using synthetic resin magnet 12 | | | | Drain bolts of the invention using synthetic resin magnet 12a | | | |
| --- | --- | --- | --- | --- | --- | --- | --- | --- | --- |
| Amount of iron particles attracted | 2.5 g | 4 g (+60%) | 7.2 g (+188%) | 10.5 g (+320%) | 13.0 g (+420%) | 4.9 g (+96%) | 9.9 g (+296%) | 14.7 g (+488%) | 19.3 g (+672%) |
| Number of parts | 3 to 4 | 2 | | | | 2 | | | |

As to the magnet shape, the sintered ferrite magnet 4 has a small freedom in shape because of its molding capability and therefore has a low dimensional accuracy, while the synthetic resin magnets 12, 12a have a high freedom in forming and a high dimensional accuracy, i.e., it can easily be formed into desired shapes that will increase the iron particle attracting capability or facilitate the assembly.

The surface flux density is 735 gausses for the sintered ferrite magnet 4 because of limitation on shape design, as opposed to 860 gausses and 1150 gausses on average for the synthetic resin magnets 12, 12a, which are about 17% and 56% improvements over the sintered magnet. This significant improvements have been achieved by elongation of the magnet and formation of the grooves 18.

The weight of the drain bolt is 37.6 g for the one using the sintered magnet 4. The drain bolts with the synthetic resin magnets 12, 12a with the length L of the projecting portion 17 ranging between 5 and 20 mm weigh 33.5 to 38 g for the magnet 12 and 34.7 to 39.6 g for the other magnet 12a. The relative reduction in weight has been brought about by the use of synthetic resin material and the formation of grooves 18. In the case of the shorter synthetic resin magnets the weight is reduced by 11 and 8% respectively. For the longer synthetic resin magnets, it increases only 1 and 5% respectively.

The amount of iron particles adhering to the sintered magnet 4 is only 2.5 g, while the synthetic resin magnets 12, 12a with the length L 5 to 20 mm of projecting portion 17 collected 4 to 13 g and 4.9 to 19.3 g of iron particles respectively. This amounts increase to 60 and 96% respectively for the magnet with a shorter projection and as high as 420 and 672% for the one with a longer projection.

As to the number of parts of the drain bolts, the conventional bolts consist of three to four parts as they require the jointing member such as the bonding agent 5, caulking member 6 or setting screw 7 in addition to the bolt body 1 and the magnet 4. On the other hand, the drain bolt of this invention consists of only two constitutional parts—the bolt body 11 and the synthetic resin magnet 12, 12a—and this means the number of component parts can be reduced by one or two.

Figure 9:
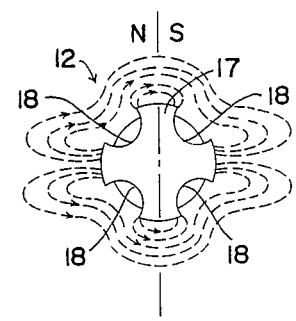
FIG. 9 is a diagram showing the magnetic field of another synthetic resin magnet.

FIG. 9 shows, for reference, the magnetic field of the synthetic resin magnet 12 of the first through fourth embodiments. It is seen from the figure that the synthetic resin magnet 12a of the fifth embodiment with two grooves 18 shown in FIG. 8 has a magnetic field whose influence reaches farther than that of the magnet 12 with four grooves 18, and therefore can attract iron particles located farther away.

As mentioned in the foregoing, the drain bolt of this invention uses the synthetic resin magnet which has high resistance against impact and can easily be formed into a complex shape with high dimensional accuracy. This allows the sinker portion of the synthetic resin magnet to be securely embedded in the recess of the male-threaded portion of the bolt body as by caulking, screw, press-fit, or insert molding which molds the synthetic resin integral with the bolt body, without using a jointing member. This in turn results in a fewer number of component parts and therefore a simpler manufacturing process. In addition, the drain bolt of this invention has the advantage that since the projecting portion of the synthetic resin magnet is projected from the male-threaded portion of the bolt body, the bolt has an increased capability of attracting the iron particles and thus can effectively collect them.

What is claimed is:

1. A drain bolt comprising:
   a bolt body consisting of a male-threaded portion and a head portion, the male-threaded portion having a recess formed at the end thereof; and
   a synthetic resin magnet consisting of a sinker portion and a projecting portion;
   wherein the sinker portion is embedded in the recess of the bolt body with the projecting portion projecting from the end of the male-threaded portion of the bolt body, and
   wherein a pair of grooves is formed on the side of the projecting portion of the synthetic resin magnet along its length so that the two grooves are symmetrical with respect to the center of the projecting portion and the synthetic resin magnet is magnetized in such a manner that the two grooves have opposite magnetic polarities.

2. A drain bold as set forth in claim 1, wherein the projecting portion of the synthetic resin magnet is larger in diameter than the sinker portion.

3. A drain bolt as set forth in claim 1, wherein the synthetic resin magnet is held in the bolt body by inserting the sinker portion of the synthetic resin magnet into the recess of the male-threaded portion of the bolt body and caulking a part of the male-threaded portion against the sinker portion.

4. A drain bolt as set forth in claim 1, wherein the synthetic resin magnet is held in the bolt body by screwing a male-threaded portion formed on the outer periphery of the sinker portion into a female-threaded portion formed on the inner periphery of the recess in the male-threaded portion of the bolt body.

5. A drain bolt as set forth in claim 1, wherein the synthetic resin magnet is held in the bolt body by press-fitting the sinker portion of the magnet into the recess in the male-threaded portion of the bolt body.

6. A drain bolt as set forth in claim 1, wherein the synthetic resin magnet is formed integral with the bolt body by inserting the bolt body into a mold of the synthetic resin magnet while the recess in the male-threaded portion of the bolt body is used as a part of a cavity for molding the synthetic resin magnet, and then molding the synthetic resin magnet.

* * * * *